Dec. 6, 1927.   W. F. BROWN   1,651,581
LAMINATED GLASS
Filed May 3, 1926
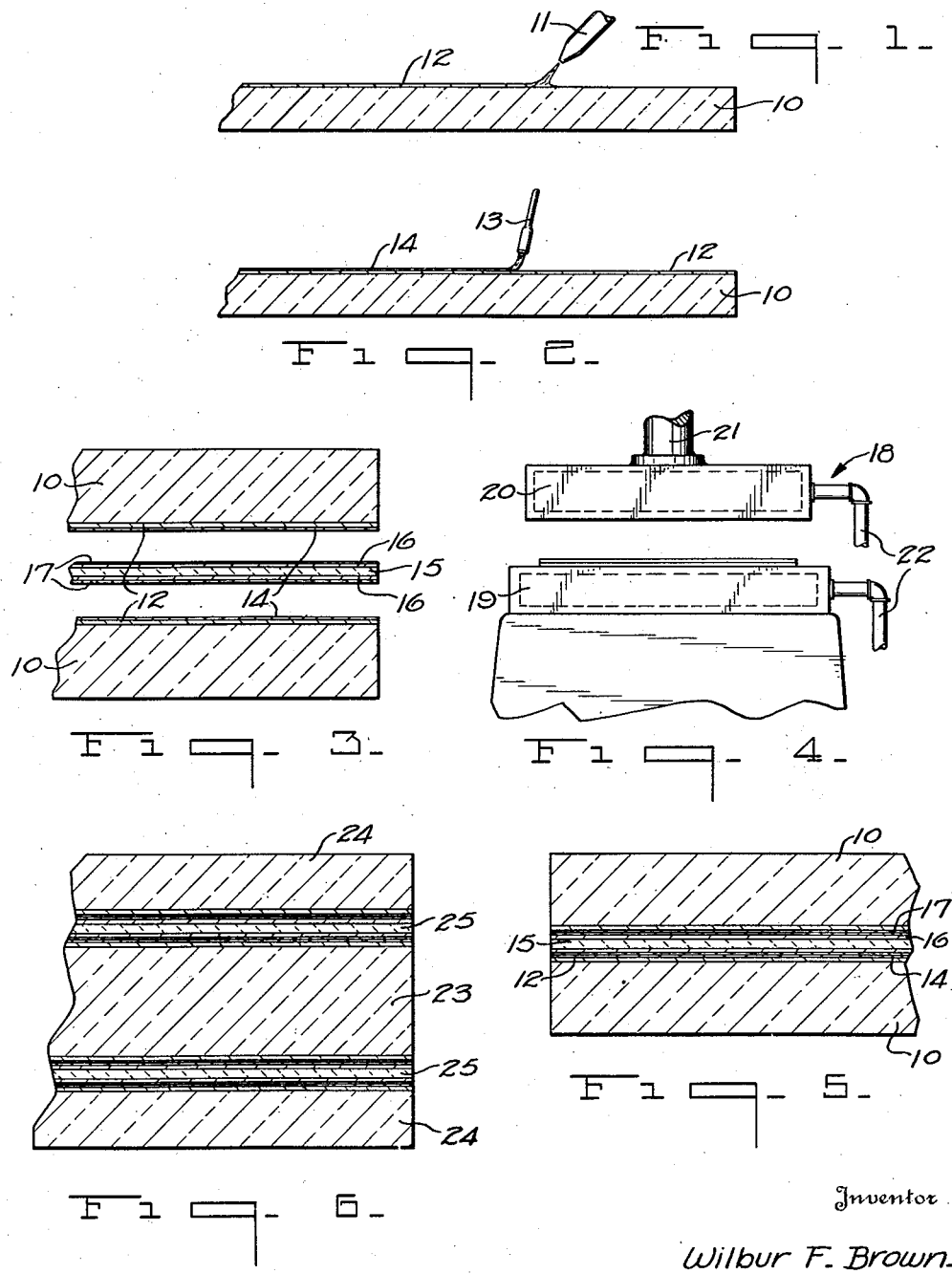
Inventor
Wilbur F. Brown.
By Frank Fraser,
Attorney Patented Dec. 6, 1927.

UNITED STATES PATENT OFFICE.

WILBUR F. BROWN, OF TOLEDO, OHIO, ASSIGNOR TO THE LIBBEY-OWENS SHEET GLASS COMPANY, OF TOLEDO, OHIO, A CORPORATION OF OHIO.

LAMINATED GLASS.

Application filed May 3, 1926. Serial No. 106,309.

The present invention relates to laminated glass.

An important object of the invention is to provide a process for producing, as a new article of manufacture, a sheet of laminated glass.

Another very important object of the invention is to provide a process for producing laminated glass wherein a sheet of glass has formed thereon a skin of cellulose formate, the said sheet, after the skin has been formed thereon, being united to a sheet of preferably non-brittle material.

Another object of the invention is to provide a process of producing laminated glass wherein one side each of two sheets of glass has formed thereon a skin of cellulose formate, the skins preferably being permitted to dry, after which they are coated with a film of preferably non-solvent oil, then interposing a sheet of non-brittle material between the coated surfaces of the two sheets of glass, and then uniting the three sheets.

Still another object of the invention is to form a sheet of laminated glass by spraying or otherwise producing a skin of cellulose formate upon one side each of two sheets of glass, then applying to the skins a film of vegetable oil, such as, for example, linseed oil, or its equivalent, forming cellulose formate skins on both sides of the sheet of non-brittle material coating a film of the above mentioned oil on the latter named skins, then interposing the coated sheet of non-brittle material between the sheets of glass, and uniting the same.

Other objects and advantages of the invention will become apparent during the course of the following description.

In the drawings wherein like numerals are employed to designate like parts throughout the same, Fig. 1 is a view illustrating diagrammatically the formation of a cellulose formate skin on a sheet of glass, Fig. 2 is a similar view showing diagrammatically coating the skin, formed in Fig. 1, with a film of suitable non-solvent liquid, Fig. 3 is a fragmentary sectional view illustrating the laminations before they are united.

Fig. 4 represents diagrammatically a form of press which may be used to unite the laminations, Fig. 5 is a fragmentary sectional view of the finished product, and Fig. 6 is a similar view of a slightly modified form of product.

Heretofore, there has been manufactured by various methods a sheet of glass called laminated glass, possessing many well known advantages over the ordinary glass because of the fact that, even though the sheets of glass contained in the laminated sheet becomes fractured, the non-brittle material ordinarily used will prevent excessive scattering of the broken glass.

Although laminated glass is desirable for many uses, because of its protective nature, it has not enjoyed an extensive use because of the inherent defects of the laminated glass caused usually as a result of the process by which it is manufactured.

It is an aim of the present invention to provide a process whereby a sheet of laminated glass may easily be formed, the finished sheet being such that constant use will not cause the laminations to separate. One of the chief difficulties encountered in the prior art processes is that a sheet of laminated glass develops what is known in the art as "let-goes". The "let-goes" are in reality places where the laminations have become separated and no longer afford the protection originally intended.

In accordance with the present invention, in Fig. 1, the numeral 10 designates a sheet of glass. The sheet of glass has sprayed or otherwise deposited thereon, by means of the spray or the like 11, a coating of cellulose formate 12, which forms a skin on the sheet of glass. After the sheet of glass has been coated with the skin 12 of cellulose formate, it is preferably permitted to dry so that all the solvents contained in the solution will evaporate off, leaving a substantially dry skin of cellulose formate.

The next step in the process is illustrated in Fig. 2, where the sheet of glass 10, having the skin 12 of cellulose formate thereon, is being coated, by means of a brush or the like 13, with a thin film of liquid such as oil 14. The present process varies from the prior art processes in that it has been customary to use some sort of solvent which will have a solvent action on the sheet of cellulose composition material ordinarily used as an intermediate sheet. As the solvent is applied either to the sheet of glass, or the sheet of cellulose composition material, or both, in the prior are processes, and then immediately pressed firmly together, the solvent has no way of escape.

In the present invention the oil 14 is preferably non-solvent, not to any great extent at least. An example of desirable film is linseed oil, or some other similar non-solvent oil, and preferably a vegetable oil.

In Fig. 3 is shown a sheet 15 which is preferably a cellulose composition material sheet, which may or may not be sprayed to form a skin 16 on both sides thereof. After the skins 16 have been formed on the sheet 15, they are given a coating of non-solvent liquid 17, the liquid used being the same as the liquid 14 illustrated in Fig. 2. Fig. 3 shows the three laminations, namely, the two sheets of glass 10 and the sheet of non-brittle material 15, in position to be united, the three laminations each having the necessary skins thereon and films of non-solvent liquids.

The laminations may then be placed in a press, designated in its entirety by the numeral 18, comprising preferably a lower platen 19 and an upper platen 20, operable by means of the movable plunger 21. Connections 22 may be provided to permit a circulation of steam or other liquid, at preferably a high temperature, through the platens so that the laminations may be united under the action of heat and pressure. It has been found that the non-solvent liquid, such as a vegetable oil, being applied to the laminations as above described, will assist considerably in obtaining an excellent and permanent union between the three laminations. At the same time the liquid will almost become entirely expelled from between the laminations, so that an almost negligible amount of liquid remains between the laminations. Although the present invention does not relate particularly to the structural details of following out the process, it is pointed out that pressure is preferably initially applied centrally of the laminations and gradually extending toward the outer extremities, so that the non-solvent liquid used will have an opportunity of becoming expelled.

Fig. 5 designates the finished sheet. It is to be understood that the drawings are purely diagrammatic, as the skins formed on the sheets of glass and the sheets of non-brittle material are relatively very thin, while the film of oil could not be seen in the sectional view, such as Fig. 5, if drawn to scale.

In Fig. 6 is illustrated a sheet of so-called bullet-proof glass formed in accordance with the present process, and comprises a central sheet 23, two outer sheets 24, two non-brittle sheets of material 25, and the various skins and coatings of oil.

Although the process has been described as including coating both the sheets of glass and the non-brittle sheets with a skin, it is to be understood that the invention also contemplates that process wherein the sheets of glass have the skins formed thereon, while the non-brittle sheets need not be treated in the same manner. It is also to be understood that the reference to liquid oil is not to be taken as an expression of limitation, as any non-solvent oil will work satisfactorily. The term non-solvent is intended to include all liquids where the solvent action is so slight as to be almost entirely negligible. The term non-solvent, therefore, is used to differentiate from a liquid which has a noticeable solvent action on the materials used in the manufacture of laminated glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. As a new article of manufacture, a sheet of laminated glass, including a sheet of glass having a skin of cellulose formate which has been coated with a film of oil.

2. As a new article of manufacture, a sheet of laminated glass, including a sheet of glass having a skin of cellulose formate thereon which has been coated with a film of non-solvent liquid.

3. As a new article of manufacture, a sheet of laminated glass, including a sheet of glass having a skin of cellulose formate thereon which has been coated with a film of vegetable oil.

4. As a new article of manufacture, a sheet of laminated glass including a sheet of glass having a skin of cellulose formate thereon.

5. As a new article of manufacture, a sheet of laminated glass, including a sheet of glass having a skin of cellulose formate thereon, and a sheet of non-brittle material having a skin of cellulose formate formed thereon.

Signed at Toledo, in the county of Lucas, and State of Ohio, this 30th day of April, 1926.

WILBUR F. BROWN.